United States Patent [19]
Haysom et al.

[11] 3,859,078
[45] Jan. 7, 1975

[54] METHOD OF OPERATING A BASIC OPEN HEARTH FURNACE

[75] Inventors: Derek W. R. Haysom, William Wells, both of Sydney, Nova Scotia, Canada

[73] Assignee: Sydney Steel Corporation, Sydney, Nova Scotia

[22] Filed: Oct. 30, 1972

[21] Appl. No.: 301,809

[52] U.S. Cl............................. 75/59, 75/60, 266/35
[51] Int. Cl............................. C21c 5/34, C21c 5/42
[58] Field of Search......... 75/60, 59; 266/34 PP, 35, 266/24

[56] References Cited
UNITED STATES PATENTS

| | | | |
|---|---|---|---|
| 2,506,598 | 5/1950 | Johnson | 75/60 |
| 2,593,505 | 4/1952 | Wagstaff | 75/60 |
| 2,665,982 | 1/1954 | Crego | 75/60 |
| 2,855,293 | 10/1958 | Sauard | 75/60 |
| 3,330,645 | 7/1967 | Moustier | 75/60 |
| 3,706,549 | 12/1972 | Knuppel | 75/60 |

*Primary Examiner*—L. Dewayne Rutledge
*Assistant Examiner*—Peter D. Rosenberg
*Attorney, Agent, or Firm*—Stevens, Davis, Miller & Mosher

[57] ABSTRACT

The modification of a basic open hearth furnace process in which a stream of oxygen is introduced into the molten metal in the furnace chamber substantially beneath the level of the molten metal in the furnace chamber by means of a tuyere extending through the furnace lining, the tuyere and adjacent parts of the furnace lining being protected from erosion by a stream of hydrocarbon fuel surrounding said oxygen stream also introduced through said tuyere.

18 Claims, 7 Drawing Figures

METHOD OF OPERATING A BASIC OPEN HEARTH FURNACE

The present invention relates to steelmaking and in particular the present invention relates to the operation of a basic open hearth furnace for use in making steel primarily from pig iron and scrap iron.

Basic open hearth furnaces for the production of steel while still being used to a substantial extent in North America due primarily to the economics of operation thereof are rapidly being replaced by basic oxygen furnaces. At the present time upwards of 80% of the steel being produced in North America is produced in basic oxygen furnaces with the result that there is substantial basic open hearth furnace plant available in North America which lies idle.

While the basic open hearth furnace produces good quality steel and provides good control over the process, its major drawback as compared with the basic oxygen furnace process is the time taken to make a heat. An average time taken to make a heat in the basic open hearth furnace compares favourably with the time taken to prepare a heat in the basic oxygen furnace which is of the order of an hour or less. This time factor contributes substantially to the increased cost in producing steel in the basic open hearth furnaces. Further in the operation of the basic open hearth furnace, heat is supplied to the charge from burners which burn fuel, e.g. oil and heat the air passing over the charge in the furnace chamber. This heat is not required in the basic oxygen furnace. Again it is possible by the basic oxygen furnace process to produce economically low carbon steels which cannot be economically produced in the conventional basic open hearth furnace.

Many attempts have been made to improve the basic open hearth furnace process. In particular, attempts have been made to inject oxygen into the molten metal in the furnace chamber for more efficient oxidation of the carbon and metalloid impurities contained therein. Further where there has been some general proposals for introducing oxygen into molten metal through the walls or base of the metallurgical vessel such as shown for example in Canadian Pat. No. 620,562 issued May 23, 1961 to L'Air Liquide, Societe Anonyme pour l'Etude et l'Exploitation des Procedes Georges Claude; Canadian Pat. No. 837,500, issued Mar. 24, 1970, to Union Carbide Corporation; Canadian Pat. No. 874,898 issued July 6, 1971, to Union Carbide Corporation; Canadian Pat. No. 798,783 issued Nov. 12, 1968, to L'Air Liquide, Societe Anonyme pour l'Etude et l'Exploitation des Procedes Georges Claude. Attempts to introduce oxygen into the molten metal in a basic open hearth furnace have however been limited to the use of oxygen lances which extend into the furnace above the molten metal. It has heretofore been considered by steel makers that the passage of oxygen into the molten metal through the open hearth furnace wall or base beneath the level of the molten metal would be impossible and undesirable from a safety point of view, inter alia because it is considered it would cause a boiling action in the molten metal in the furnace chamber which boiling action in conventional steelmaking practice is controlled as far as possible as it reduces excessive wear of the refractories of the lining of the furnace. Further, particularly with high silicon iron, i.e. basic steel making iron low in phosphorus it was considered that the introduction of oxygen into the molten metal would cause excessive slag foaming due to the formation of silicon dioxide in the molten metal, thus restricting the flow of gases, e.g. carbon monoxide and carbon dioxide from the molten metal in the furnace causing the foamed slag to exit from the furnace through the doors and other outlets. Again it was considered that such oxygen introduction, due to the great size of the molten metal bath in the furnace chamber, would not give uniform oxidation of the carbon leading to the production of a non-homogeneous steel. Still further it was believed that the shallowness of the molten metal bath, would be insufficient to prevent the blowing of the molten metal by the oxygen stream entering under high pressure directly into the metal bath out of the furnace chamber. Yet again it was considered that there would be rapid excessive erosion of the refractories adjacent the point of introduction of the oxygen into the furnace in the lining of the furnace which would cause failure of the furnace wall as well as of the pipe used to introduce the oxygen into the furnace. As shown for example in U.S. Pat. No. 3,201,104 issued Aug. 17, 1965, to Walter V. Berry; U.S. Pat. No. 3,169,159 issued Feb. 9, 1965, to A. Jackson; U.S. Pat. No. 2,475,205 issued July 5, 1949, to G. V. Slottman; U.S. Pat. No. 3,353,808 issued Nov. 21, 1967 to L. E. Norburn and U.S. Pat. No. 2,506,598 issued May 9, 1950 to E. A. Johnson Jr., as well as Canadian Pat. No. 774,040 issued Dec. 19, 1967 to Union Carbide Corporation, Canadian Pat. No. 841,539 issued May 12, 1970, to Kennecott Copper Corporation and Canadian Pat. No. 831,914 issued Jan. 13, 1970 to Noranda Mines Limited; an article entitled "Increasing the Output of Existing Open Hearth Furnaces", by Ya. A. Shneerov, page 687 to 692 of the September, 1963 issue of STAL 9, and an article entitled "Oxygen Steelmaking in the Basic Open Hearth Furnace" by A. Jackson, "A Symposium on Chemical Engineering in the Metallurgical Industries PROC 25-26 (1963) Institution of Chemical Engineers", pages 7 to 14, it is conventional to introduce oxygen into the molten metal bath of a basic open hearth furnace through the slag metal interface. In practice such oxygen lancing is not particularly effective as only a very small portion of the oxygen actually enters the bath and the oxygen which enters the bath is limited to the surface layer of the molten metal bath. Heretofore, therefore, in the majority of steel mills to improve the oxidation of the carbon and metalloids in the molten metal bath of the basic oxygen open hearth furnace process, oxygen has been introduced into the furnace chamber in the space above the molten metal by means of water cooled oxygen lances extending through the roof of the furnace. However, while this does improve the speed of oxidation in the process it causes substantial pollution in the atmosphere due to the formation of finely divided ferric oxide which is carried away by the hot air passing through the space in the furnace above the molten metal bath and again due to the heat generated in the space above the molten metal in the furnace the basic furnace lining above the charge is rapidly eroded away requiring frequent replacement and downtime of the furnace.

The present invention provides a modification of the basic open hearth furnace and its operation thereof which substantially increases the output of steel from the furnace and in particular provides for an extremely efficient oxygen utilization in the process, gives substantially higher yields of steel from a particular charge, substantially reduces the pollution, is capable of producing a high quality low carbon steel, reduces substantially the refractory consumption per ton of steel in the process and provides a higher output of steel which enables the basic open hearth furnace process to produce steel at costs comparative to that produced in the basic oxygen furnace process. At the same time the inherent advantages of the basic open hearth furnace process such as control and flexibility of the process as well as the possibility of using high scrap charges may be taken advantage of.

It has now been found according to the present invention that by introducing a stream of oxygen through at least one tuyere, and preferably a plurality of longitudinally spaced tuyeres, extending horizontally through the furnace lining at a point substantially beneath the level of the molten metal in the furnace chamber and preferably adjacent the base thereof, the aforesaid advantages can be achieved, the tuyere and furnace wall being protected from erosion by simultaneously introducing a stream of hydrocarbon fuel, such as propane, through said tuyere so as to surround the oxygen stream.

According to the present invention, therefore, there is provided in a basic open hearth furnace chamber having a basic refractory lining for use in the production of steel, the improvement comprising at least one tuyere extending horizontally through the furnace lining substantially beneath the level of the molten metal normally contained in said chamber for the introduction of oxygen into the molten metal contained therein, said tuyere comprising an inner tube and an outer tube surrounding said inner tube and providing a space therebetween, means for introducing an oxygen stream into said furnace chamber through said inner tube and means for introducing a stream of hydrocarbon fuel into said furnace through said space between said tube whereby said fuel stream on passing into said furnace chamber surrounds the oxygen stream and protects the tuyere and adjacent portions of the furnace lining from erosion.

The present invention also provides in the operation of a basic open hearth furnace in the production of steel the improvement which comprises introducing a stream of oxygen into the chamber of said furnace at a point substantially beneath the surface of said molten metal through at least one tuyere extending horizontally through the furnace lining causing boiling of the molten metal and effecting oxidation of the carbon and metalloid impurities into said molten metal and simultaneously introducing the stream of hydrocarbon fuel into said molten metal through said tuyere so as to surround said oxygen stream and protect the tuyere and the furnace lining adjacent said tuyere from erosion.

The introduction of the oxygen stream(s) substantially beneath the level of the surface of the molten metal and preferably adjacent the basic open hearth furnace provides for passage of oxygen upwardly through the molten metal providing for efficient use of the oxygen in oxidizing the carbon and metalloid impurities such as carbon, silicon, phosphorus and manganese, in the molten metal there being intimate contact of the molten metal and the oxygen. The process of the present invention provides improved yields of steel from a particular furnace charge and when the oxidation of iron to ferrous oxide occurs in the molten charge, the generation of finely divided ferric oxide from the charge into the air passing over the charge is substantially reduced which again increases the yield of steel and reduces pollution of the atmosphere. Due to the efficiency of oxidation a greater proportion of the carbon in the steel can economically be oxidized to carbon monoxide and carbon dioxide and thus the process of the present invention can economically produce high quality, low carbon steels.

As the oxidation of carbon, silicon, manganese, phosphorus and iron are exothermic reactions and the heat generated during the oxidation is used to sustain the steelmaking process and less heat or no heat is required externally of the oxidation process and thus the amount of fuel which is needed for the burners to heat the air passing over the molten metal in the furnace is substantially reduced and may be eliminated in the furnace chamber when the flow of oxygen into the molten metal is sufficiently fast to provide all the heat to maintain the required temperature. Thus in the process of the present invention the conventional fuel consumption of the basic open hearth furnace is substantially reduced and may be eliminated. Yet again as the heat from the exothermic reactions is generated directly in the molten metal and not in the space above the molten metal this space remains relatively cool and the erosion of the refractory lining in the space above the molten metal bath is substantially reduced.

Heretofore the air passing over the molten metal serves inter alia as a primary oxidant for the metalloid and metal impurities in the molten metal. As in the process of the present invention oxygen is being fed directly to the steel the requirement of air for the oxidation of these impurities in the steel is substantially reduced and may also be eliminated when the flow of oxygen is sufficient to effect oxidation, air flow may still be useful however in converting the carbon monoxide generated by the oxidation of carbon in the molten metal bath to carbon dioxide as it leaves the bath with the generation of heat which heat may be regenerated and recovered in the checkers of the conventional basic open hearth furnace and be used as an auxiliary aid in maintaining the temperature of the molten metal bath. Thus with high oxygen flow rates into the molten metal bath the flow of air through the furnace chamber above the bath, as well as the flow of fuel to the burners of the basic oxygen hearth furnace may be eliminated or the air may be used solely to remove gases generated in the process from the furnace chamber. It is, however, to be noted that when air does flow through the furnace over the molten metal bath, the air flow effects some oxidation of the carbon and the efficiency of the oxygen in the oxidation in view of this air flow is found to be very high and may be as high as 132 to 140%.

A major improvement over the conventional basic open hearth furnace process is the overall speed of the process in which the oxidation time in producing a heat may readily be reduced to the order of an hour or less which compares favourably with the operation time of the basic oxygen furnace process. Further the basic open hearth furnace process has the advantage of allowing substantially better control over the process and having greater flexibility in that in the basic open hearth furnace process the raw furnace charge may be solid scrap iron, solid pig iron, molten pig iron or mixtures thereof whereas in the basic oxygen furnace process molten pig iron must always be present and scrap can be used only in limited amounts. In the basic open hearth process of the present invention scrap can be present in the furnace charge in amounts well above 30% by weight and may be present in amounts at least 60% by weight and the process being readily operable with such high scrap content in the furnace charge.

The process of the present invention has substantial flexibility as compared with the basic oxygen furnace process. In particular, it is possible in the basic open hearth furnace process of the present invention to determine at any particular time the carbon content and the temperature of the molten metal in the furnace chamber. It is also possible to adjust the temperature of the molten metal in the furnace as required. For example, the temperature of the molten metal may be increased by means of the conventional burners present in the basic open hearth furnace for heating air passing over the molten metal and/or by means of heat generated from the checkers. The temperature of the molten metal in the furnace may be decreased by the addition of scrap iron ore, or mill scale to the furnace chamber. It is also possible to slow down the process by increasing the hydrocarbon fuel flow through the tuyere with commensurate adjustment of the temperature of the metal bath by means of the burners or the regenerated heat from the checkers. This has great advantage with the development in continuous casting as it is possible to provide steel heats of the precise composition required precisely when needed even with late adjustments to the time. Further, due to the controlled temperature and oxygen injection and thus the speed of the process, it is simple to determine when to tap the furnace and to know this tapping time for a substantial period of time before tapping occurs. At the same time the precise quality of the steel being tapped is already known and thus uniform quality steel can readily be made in the process of the present invention.

It is also possible in the process of the present invention to introduce any material desired into the molten metal by entraining the material in a gas stream in the tuyere. This entrainment may readily be achieved with conventional equipment for injecting particulate solids into gas streams and for example lime may be added to yield low sulphur steel, carbon may be added to adjust the length of time of the process of forming the steel and iron ore or mill scale may be added for cooling the metal in the furnace and also for adding iron and oxygen to the molten metal.

It has been found that for efficient operation in the process of the present invention there is for a particular oxygen flow rate into the molten metal, a particular linear relationship between the rate of reduction of the carbon content of the molten metal and the rate of increase of temperature of the molten metal. Thus by determining the carbon content of the molten metal at a particular time and its temperature and by adjusting the temperature to this linear relationship, the precise time of tapping, i.e. achieving the required carbon content in the steel heat tapped from the furnace is readily ascertainable and provided the tapping occurs at this time the quality of the steel is assured. When it is desired to extend the process time then adjustment of the oxygen flow rate or addition of carbon can be made with appropriate adjustment of the temperature of the molten metal in the furnace and a new tapping time can be readily ascertained for the same quality of steel.

It is essential to the present invention that the tuyeres and the basic refractory lining surrounding the tuyeres be protected from erosion. In order to provide for this the oxygen stream is surrounded by a stream of hydrocarbon fuel such as propane. This is achieved by providing the tuyere in the form of inner and outer spaced tubes, which are preferably coaxial, the oxygen stream passing through the inner tube, and the hydrocarbon fuel passing through the space between the inner and outer tubes. The tuyere is fitted in refractory bricks so that the outer tube has a close fit in the refractory bricks. These bricks containing the tuyere are then bricked or rammed into position with high grade refractory material in such a way that the refractory bricks form part of the lining of the furnace. The positioning of the refractory bricks is important in that they are desirably laid so that the bottom of the furnace is lower than the inlet point of the tuyere thereby avoiding excessive erosion of the tuyere and furnace lining after the furnace is tapped. Suitable tuyeres are those disclosed in U.S. Pat. Nos. 3,771,998 and 3,706,549. In a particular embodiment of the present invention the outer tube of the tuyere is desirably slidable in a sleeve fitted in the refractory bricks so as to be able to be adjustably extended into the furnace chamber as the end is eroded away thus minimizing the erosion of the refractory lining adjacent the end of the tuyere.

It is a critical feature of the present invention that the hydrocarbon fuel, e.g. propane, flow through the tuyere at a rate sufficient to provide on dissociation of the fuel on entry into the molten metal sufficient cooling to protect the tuyere and the surrounding refractory lining of the furnace chamber from erosion. It is generally found that the fuel, e.g. propane should constitute less than 6% and at least 3½% by volume of the oxygen stream and is suitably in the range 3½ to 5% by volume when injected into the molten metal but these ratios are not fixed and are finally determined by the size of the tuyere for the installation. When the tuyere is being used to melt iron scrap at the initial start up of the furnace the fuel flow through the tuyere may be increased even more so as to provide a burning flame, i.e. generate heat for melting the iron scrap. The oxygen velocity through the tuyere should be as high as possible so that the oxidation reaction and the exothermic heat so generated is as far away as possible from the end of the tuyere and also the refractory lining of the furnace. Suitably the header pressure of the oxygen at the tuyere should not be less than 100 lbs. per sq. in. and preferably 200 lbs. per sq. in. The header pressure of the propane suitably is in the range 90 to 120 lbs/sq. inch. Thus the header pressure at the tuyere must be sufficient to overcome the ferrostatic head of the molten metal in the furnace and to provide a pressure which will result in a high velocity of the oxygen injected into the molten metal. The faster the oxygen is passed into the molten metal the quicker the reaction and for example in a 220 ton basic open hearth furnace with a flow rate of 100,000 cubic feet per hour, the time taken for the oxidation reaction is about 80 minutes. With flow rates up to 1,200,000 cubic feet per hour, oxidation times of less than 20 minutes are achieved. The flow rate of the oxygen into the molten metal is at a rate which is proportional to the size of the charge in the furnace and the area of the tuyere and for example very typically form tuyere of 16 mm. inner diameter tube and a charge of 220,000 tons of steel in the furnace varying from 30,000 cubic feet per hour for a single tuyere to 1,200,000 cubic feet per hour for multiple tuyeres. At such fast oxidation times the air flow over the molten metal bath in the basic open hearth furnace may be substantially eliminated as may also the fuel fed to the burners to heat the air passing over the surface of the metal bath.

In the process of the present invention, according to one embodiment thereof the steel is made by charging cold scrap into the furnace with hot pig iron. During the addition of the scrap the oxygen and hydrocarbon fuel streams are injected into the scrap from the tuyeres to raise the temperature of the scrap and with the addition of the hot metal the refining is carried out to achieve the required quality of the steel. When the steel is ready for tapping the tap hole is opened and an inert gas such as nitrogen or argon is introduced into the molten metal in place of the oxygen to stop the reaction and to assist in obtaining the steel to the specification required. It is always necessary to continue the flow of gas through the tuyere during the tapping of the furnace in order to maintain the tuyere open for subsequent charging and operation of the furnace.

The present invention will be further illustrated by way of the accompanying drawings in which.

Figure 1:
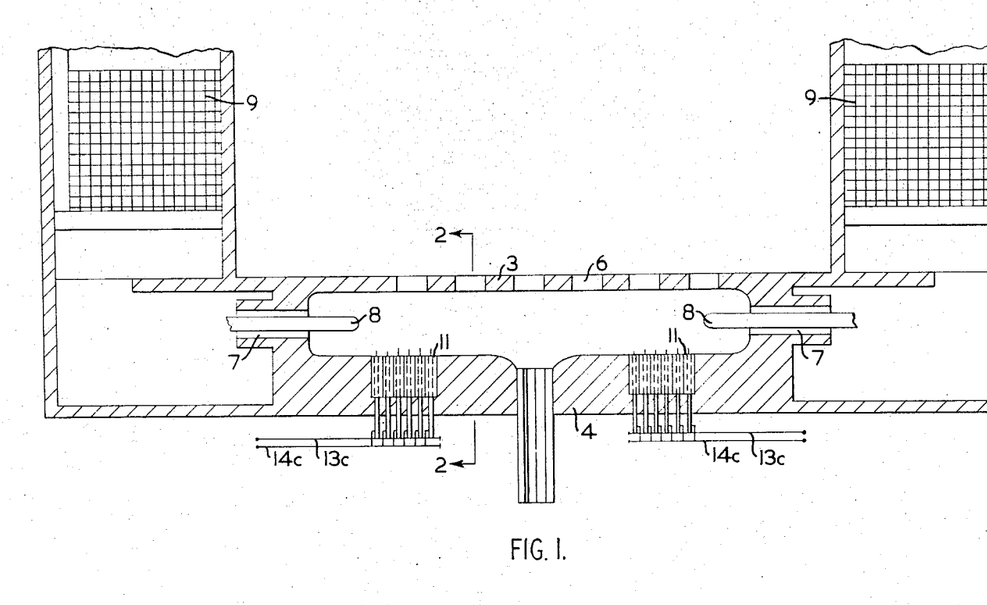
FIG. 1 is a plan view partially in section of a basic open hearth furnace modified in accordance with one embodiment of the present invention.
Figure 2:
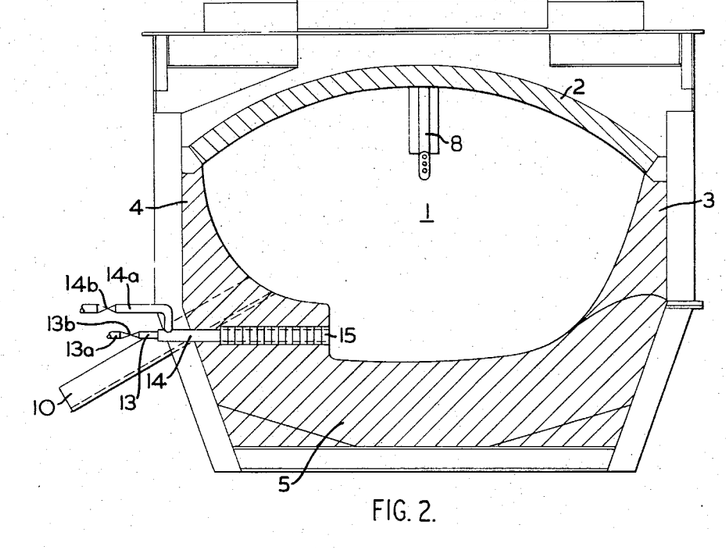
FIG. 2 is a section taken along the line A—A of FIG. 1.
Figure 3:
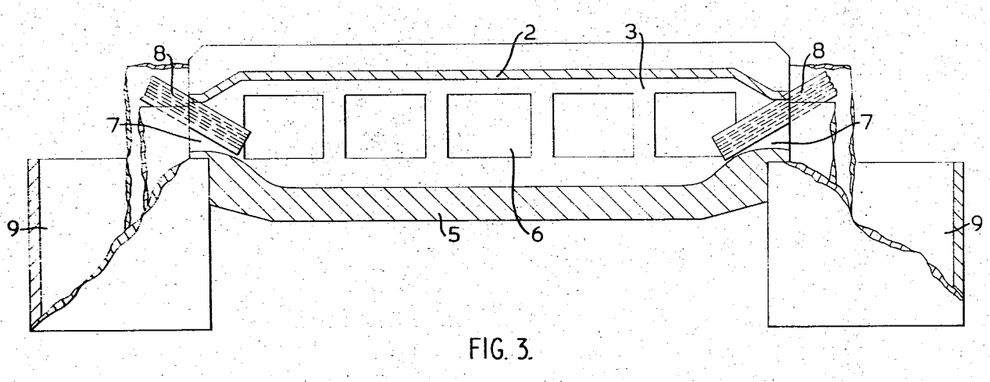
FIG. 3 is a side elevation partially in section of the furnace of FIG. 1.

Referring to the drawings the basic open hearth furnace in accordance with the present invention comprises a furnace chamber 1 defined by a roof 2, a front wall 3, a back wall 4 and a bottom 5 all formed of magnesite brick. The furnace is charged through openings 6 in the front wall which are closed by doors (not shown). Air is normally blown over the charge in the furnace chamber 1 by means of fans (not shown) through inlets and outlets 7, the air being at least initially heated by oil burners 8. Excess heat is recovered in checkers 9 and the air flow periodically reversed to use the heat in the checkers to preheat the incoming air. On completion of the heat the furnace is tapped through spout 10 in the rear walls 4 of the furnace chamber 1 which may be of a stationary or tilting basic open hearth furnace as required. The open hearth furnace described up to the present time is conventional and as such is generally schematic and not described in absolute detail.

Figure 4:
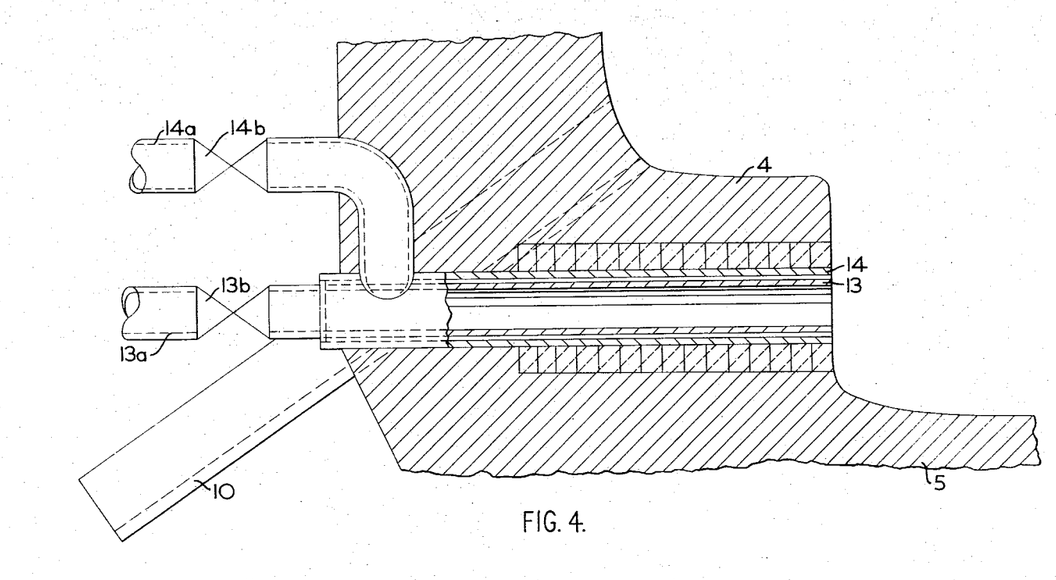
FIG. 4 is a detail of the installation of the tuyeres in the furnace in FIG. 1.
Figures 5, 6, 7:
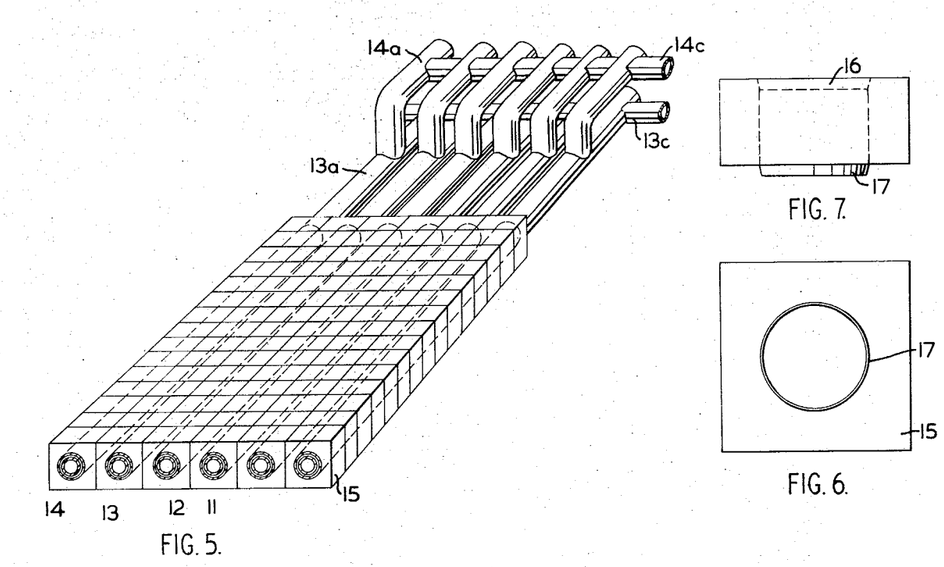
FIG. 5 is a detail of the tuyeres mounted in the refractory brick lining installation in the furnace of FIG. 1.
FIG. 6 is a front elevation of a particular refractory brick used in the detail of FIG. 5.
FIG. 7 is a plan view of the brick of FIG. 6.

In accordance with the present invention, the furnace chamber 1 has banks 11 of tuyeres 12 extending horizontally through the rear wall 4 thereof on either side of the tapping spout 10. Each tuyere 12 is comprised of an inner tube 13 and an outer coaxial tube 14. A stream of oxygen is passed through the inner tube 13 via line 13a containing control valve 13b from header 13c and a stream of hydrocarbon fuel, e.g. propane, passes through the gap between tubes 13 and 14 via line 14a containing control valve 14b from header 14c. The outer tube 14 is cemented into tar impregnated high density magnesite brick 15, each brick being adapted to interlock similar brick by means of recesses 16 and protuberances 17. The banks of tuyeres 11 as will be seen from the drawings, particularly FIGS. 2 and 4, extend into the furnace chamber 1 adjacent to but spaced from the bottom 5 of the furnace. This avoids on tapping the furnace of a residual pool of molten metal covering the tuyere as would occur if the tuyere 11 extended through the base of the furnace which molten metal pool combined with the oxygen flow would rapidly erode the end of the tuyeres 11 and the refractory lining adjacent the tuyeres 11.

The present invention will be further illustrated by way of the following Example:

EXAMPLE

Using a 200 ton furnace of the construction shown in the accompanying drawings, the furnace chamber 1 was heated for about 10 to 12 hours by means of burners 8 with air flow through the furnace chamber 1 of the inlets 7 to bring the furnace up to an operating temperature of about 2,400°F. The solid materials making up the furnace charge, in particular the lime, limestone, iron ore and scrap, in that order were added to the furnace chamber and during charging of these materials, maximum fuel was burnt through the burners 8 and in addition oxygen and propane were passed through the tuyeres 12 to heat and start melting the scrap in the furnace charge. During the heating of the furnace chamber 1 and the melting of the scrap in the furnace charge, fuel oil was supplied to the burners 8 at a rate of 700 gallons per hour which burners 8 were shut off when the molten pig iron was added to the furnace charge. When the addition of the scrap iron through the furnace charge was complete, hot pig iron in an amount to make up the required tap weight was added to the furnace charge and the oxygen and propane introduced through the tuyeres 12 was increased until the desired flow of oxygen was obtained and the propane was at least 3½% by volume of the oxygen. The oxygen flow into the furnace was continued until the steel reached the required carbon content and required temperature when it was tapped through a jet tapper and spout 10. During the blowing period, i.e. the period when the oxygen was blown into the molten ferrous metal in the furnace chamber 1, samples were periodically taken from the furnace chamber 1 and necessary adjustments to the temperature of the bath remained throughout the blowing period by additions of iron ore or scrap for cooling the furnace chamber wall or by passing fuel oil to the burners 8 to heat the furnace chamber 1 when the temperature in the furnace 1 was too low. As aforesaid when the composition and temperature of the steel in the furnace chamber 1 reach the required level the furnace chamber 1 was tapped and a reduced amount of oxygen is continously passed through the tuyeres 12 until the steel has left the furnace chamber 1. Once the furnace chamber 1 is empty the oxygen flow is replaced by a nitrogen flow through the tuyeres 1, the furnace then being ready for inspection and repair. The operating conditions and results obtained are as follows for a particular series of heats:

| | |
|---|---|
| Yield (metallic to good ingots) | 90% |
| Average Rate (tap to tap) | 50 Tons/Hr. |
| Average Rate (charge to tap) | 83 Tons/Hr. |
| Oxygen Blow Rate (max.) | 135,000 ft.$^3$/hr. |
| Oxygen Used (ft.$^3$/ton) | 819 |
| Oxygen Efficiency | .088 lb. of C/ft.$^3$ of O$_2$ |
| Carbon Drop Rate | 4.00 pts./min. |
| N$_2$Used (ft.$^3$/ton steel) | 299 |
| Propane Used (gal/ton steel) | 2.0 |
| Average Oil Used (gal/ton steel) | 4.6 |
| Average Scrap Chg.% | 33.0 |
| Average Hot Metal Chg.% | 66.7 |
| Iron Ore Used (lb./ton steel) | 53 |
| Limestone Used (lb./ton steel) | 8 |
| Lime Used (lb./ton) | 39 |
| Cold Pig Iron Chg. % | 0.3 |
| Blowing Time | Finish Hot Metal to Tap 76 min. |
| Average Oxygen Blowing Rate | 104,000 S C F/Hour |

It was found that in the aforesaid process that the substantial boiling of the molten furnace metal in the furnace chamber 1 does not cause any substantial erosion of the refractory lining of the walls of the furnace chamber 1 and further with the longer life of the refractories on the roof 2 of the furnace chamber 1 the periods of downtime for relining the furnace chamber 1 is reduced. It is also found that even with the use of high silicon irons in the furnace chamber 1 foaming of slag in the furnace chamber 1 is at a minimum and it is believed this is due to the high surface area of the molten metal in the furnace chamber 1 which reduces agglomeration of any silicon dioxide formed by oxidation of the silicon. It is further found that adequate agitation of the ferrous metal occurs in the furnace chamber 1 to produce a substantially homogeneous steel heat. It is also found that by controlling the flow of gases into the molten metal in the furnace chamber 1, i.e. by the size of the pipes and the pressure of the oxygen at the headers, splashing of the molten ferrous metal through the furnace doors does not significantly occur.

The process of Example 1 may be operated with a wide range of hot pig iron to solid metal scrap proportions and make all grades of steel. Fuel consumption through the furnace burners 8 may be reduced to substantially zero when the hot pig iron proportion in the furnace charge reaches at least 70% and approximately 1700 cubic feet of oxygen per ton of steel is available in a period of not more than 30 minutes. During this period the furnace combustion air is maintained at a maximum to burn the carbon monoxide evolved from the molten ferrous metal bath.

The embodiments of the invention in which an exclusive property or privilege is claimed are defined as follows:

1. In the operation of a basic open hearth furnace in the production of steel the improvement which comprises introducing a stream of oxygen horizontally into the molten metal in the chamber of said furnace at a point substantially beneath the surface thereof through at least one tuyere extending through the furnace lining causing boiling of the molten metal in said furnace chamber and effecting oxidation of the carbon and metalloid impurities therein to form said steel and simultaneously introducing the stream of hydrocarbon fuel into said molten metal through said tuyeres to surround said oxygen stream and protect the tuyere and the furnace lining adjacent said tuyere from erosion.

2. In the operation of a basic open hearth furnace in the production of steel including passing a mixture of air and fuel over the charge in the chamber of said furnace, the improvement which comprises introducing a stream of oxygen horizontally into the molten metal in the chamber of said furnace at a point substantially beneath the surface thereof through at least one tuyere extending through the furnace lining causing boiling of the molten metal in said furnace chamber and effecting oxidation of the carbon and metalloid impurities in said molten metal to form said steel and simultaneously introducing the stream of hydrocarbon fuel into said molten metal through said tuyeres so as to surround said oxygen stream and protect the tuyere and the furnace lining adjacent said tuyere from erosion whereby the fuel to air ratio in said stream is substantially reduced.

3. The operation as claimed in claim 2 in which the fuel in said air is substantially eliminated.

4. The operation as claimed in claim 3 in which the air flow is substantially eliminated.

5. The operation as claimed in claim 1 in which the oxygen and hydrocarbon fuel are fed through tuyeres at a plurality of longitudinally spaced points in said furnace chamber.

6. The operation as claimed in claim 5 in which the hydrocarbon fuel stream comprises 1% to 5% by volume of said oxygen.

7. The operation as claimed in claim 6 in which the hydrocarbon fuel is propane.

8. The operation as claimed in claim 7 in which the header pressure of propane is from 90 to 120 lbs/sq. inch.

9. The operation as claimed in claim 5 in which the header pressure of the oxygen and hydrocarbon at said tuyeres is at least 100 pounds per square inch.

10. The operation as claimed in claim 5 in which the header pressure of the oxygen and hydrocarbon at the tuyeres is at least 200 pounds per square inch.

11. The operation as claimed in claim 1 in which after completion of the oxidation of said carbon and metalloid impurities in said molten metal to form said steel a non-oxidizing gas is fed through said tuyeres in place of said oxygen.

12. The operation as claimed in claim 1 in which the charge fed to said furnace comprises a mixture of scrap and molten iron.

13. The operation as claimed in claim 12 in which the scrap comprises at least 50% of the metal charge.

14. A method as claimed in claim 12 in which the metal charge compiises at least 70% molten iron.

15. The operation as claimed in claim 1 in which particulate lime is incorporated in the oxygen stream to effect desulphurization of the ferrous metal during formation of said steel.

16. The operation as claimed in claim 1 in which oxides of iron are added to said furnace by entrainment in the tuyere gas stream to lower the temperature in said furnace chamber.

17. The operation as claimed in claim 1 in which the iron is a high silicon iron.

18. In a basic open hearth furnace chamber having a basic refractory lining for use in the production of steel the improvement comprising at least one tuyere extending through the furnace lining of said furnace chamber substantially beneath the level of the molten ferrous metal contained therein for the introduction of oxygen into the molten ferrous metal contained therein.

* * * * *

UNITED STATES PATENT AND TRADEMARK OFFICE
CERTIFICATE OF CORRECTION

PATENT NO. : 3,859,078

DATED : January 7, 1975

INVENTOR(S) : Derek W.R. HAYSOM et al

It is certified that error appears in the above-identified patent and that said Letters Patent are hereby corrected as shown below:

Column 1, line 6, insert --,-- after "steel";

line 8, insert --,-- after "thereof";

line 22, change "favourably" to --unfavourably--;

line 26, insert --,-- after "Further";

line 29, insert --,-- after "oil";

line 40, change "Further where" to --Furthermore,--;
and change "has" to --have--;

line 63, insert --,-- after "possible";

line 64, change "reduces" to --produces--;

line 66, insert -- - -- (a dash) between "steel"
and "making"; and insert a --,-- after "phosphorus".

Column 2, line 4, insert --,-- after "dioxide";

line 5, insert --,-- after "Furnace";

line 16, insert --, or-- after "rapid";

lines 41 and 42, insert -- - -- (a dash) between
"slag" and "metal"; and         line 59, insert --,-- after "bath".

Column 3, line 5, insert --,-- after "steel";

line 33, insert --,-- after "tube";

line 38, change "tube" to --tubes--;

line 43, insert --, -- after "provides";

line 45, insert --,-- after "steel";

UNITED STATES PATENT AND TRADEMARK OFFICE
CERTIFICATE OF CORRECTION

PATENT NO. : 3,859,078
DATED : January 7, 1975
INVENTOR(S) : Derek W.R. HAYSOM et al It is certified that error appears in the above-identified patent and that said Letters Patent are hereby corrected as shown below:

Column 3, line 49, insert --,-- after "lining";
        line 52, change "the" to --a--; and
        line 58, insert --base of the-- before "basic".

Column 4, line 11, eliminate "and";
        line 14, eliminate "and" and insert a --.-- after "process" and capitalize "Thus";
        line 30, change "serves" to --served--;
        line 33, insert --such-- before "air";
        line 35, insert --injected-- before "oxygen";
        line 36, insert a --.-- after "oxidation" and capitalize "Air";
        line 39, change "with the generation" to --This generates" and insert a --.-- after "bath" (second occurrence);
        line 40, insert --,-- after "heat" (first occurrence) eliminate "of", "heat" (second occurrence) and "regenerated and";
        line 54, insert --,-- after "high" (first occurrence)
        line 57, insert --.-- after "process"; eliminate "in which" and capitalize "The"; and
        line 60, insert --present--before "basic" (second occurrence).

UNITED STATES PATENT AND TRADEMARK OFFICE
CERTIFICATE OF CORRECTION

PATENT NO. : 3,859,078

DATED : January 7, 1975

INVENTOR(S) : Derek W.R. HAYSOM et al

It is certified that error appears in the above-identified patent and that said Letters Patent are hereby corrected as shown below:

Column 5, line 5, change "being" to --is--;

line 34, insert --ahead-- after "period"; insert a --.-- after "time"(first occurrence) and eliminate "before tapping occurs.";

line 43, insert --.-- after "streams"; eliminate "and"; change "for" to --For-- and insert a --,-- after "example";

line 50, insert a --,-- after "is" and change "particular" to --given--; and     lines 59 and 60, insert a --,-- after "ascertainable".

Column 6, line 35, eliminate "and at least 3-1/2%" and insert --such as 1 to 5%--;

line 57, insert a --.-- after "reaction"; eliminate "and" and capitalize "For";

line 65 insert a --.-- after "tuyere"; eliminate "and" (second occurrence) and capitalize "For";

line 66, change "form" to --for--; insert --a-- after "for"; change "inner diameter" to --diameter inner--;

line 67, change "220,000" to --220--and insert --tons-- after "220", eliminate "tons"; insert a --,-- after "furnace".

UNITED STATES PATENT AND TRADEMARK OFFICE
CERTIFICATE OF CORRECTION

PATENT NO. : 3,859,078
DATED : January 7, 1975
INVENTOR(S) : Derek W.R. HAYSOM et al It is certified that error appears in the above-identified patent and that said Letters Patent are hereby corrected as shown below:

Column 7, line 1, change "varying" to --the oxygen may vary--

Column 8, lines 8 and 9, change "avoids on tapping the furnace to --prevents the formation--;

line 10, insert --on tapping the furance,-- after "tuyere";

line 11, change "which" to --such--; and line 50, change "remained" to --were made--;

IN THE CLAIMS

Claim 1, line 9, insert --,-- after "steel"; and line 10, change "the" to --a--.

Claim 2, line 11, insert --,-- after "steel"; and line 12, change "the" to --a--.

Signed and Sealed this ninth Day of December 1975

[SEAL]

Attest:

RUTH C. MASON
*Attesting Officer*

C. MARSHALL DANN
*Commissioner of Patents and Trademarks*